United States Patent [19]
Richmond et al.

[11] Patent Number: 5,805,156
[45] Date of Patent: Sep. 8, 1998

[54] AUTOMATED MEDIA CAPTURING SYSTEM

[75] Inventors: Michael S. Richmond; James M. Butler, both of Beaverton, Oreg.

[73] Assignee: Intel Corporation, Santa Clara, Calif.

[21] Appl. No.: 797,859

[22] Filed: Feb. 10, 1997

Related U.S. Application Data

[63] Continuation of Ser. No. 308,754, Sep. 19, 1994, abandoned.

[51] Int. Cl.⁶ ........................................... G06F 15/00
[52] U.S. Cl. .................................................. 345/328
[58] Field of Search ................................. 345/326, 327, 345/328, 329, 333

[56] References Cited

U.S. PATENT DOCUMENTS 5,442,690  8/1995  Nazif et al. .............................. 379/207
5,508,940  4/1996  Rossmere et al. ....................... 395/154

OTHER PUBLICATIONS

Intel Smart Video Recorder, an Intel product marketing brochure, published 1993.
Intel ProShare Personal Conferencing, an Intel product marketing brochure, published 1994.

*Primary Examiner*—Phu K. Nguyen
*Attorney, Agent, or Firm*—Blakely, Sokoloff, Taylor & Zafman

[57] ABSTRACT

A capture device permits selecting portions of a media stream encoded with associated data based on specified event data. The associated data corresponds to the content within the media stream, and the event data includes words and phrases of media desired by a user. The capture device contains a media processing unit, a delay device, and a control device. The media processing unit includes a decoder that is configured to receive media streams and extract the associated data from the media stream. The delay device, configured as a circular buffer, stores a predetermined length of the media stream. The control device receives the event data, compares the associated data with the event data, and generates a trigger event when the associated data matches the event data.

23 Claims, 5 Drawing Sheets

AUTOMATED MEDIA CAPTURING SYSTEM

This is a continuation of application Ser. No. 08/308,754, filed Sep. 19, 1994, abn.

FIELD OF THE INVENTION

The present invention relates to the field of communication systems, and more particularly, to methods and apparatus for an automated media capturing system.

BACKGROUND OF THE INVENTION

In general, many communication systems exist to transfer a large amount of media via a network or a broadband communication system. The media includes any text, video or audio, such as an analog audio/video signal, digital audio, digital video, and textual data streams. Typically, a user is connected to a network or a broadband communication system to receive multiple channels or to access multiple streams of media on the system. Although such a general broadcast system provides access to many media sources, a user must sort through the various sources to find particular media items of interest to that user.

For example, in a television broadcast or cable network system, a user may desire to view television programming related to the stock market. Because many television programs, including news programs, may provide information pertaining to the stock market, the user must manually search through the channels to find programming on the stock market. In addition, a user may desire to receive the latest information as it becomes available. Consequently, it is desirable to provide a system that permits an automated search of the incoming media to selectively capture portions desired by one or more users.

Methods for encoding textual information for an audio/video television signal, such as a national television standards committee (NTSC) signal, are provided through closed captioning and teletext encoding. The teletext encoding provides textual information relating to the particular television program without interfering with the audio/video content of the signal. For a television program that is prerecorded for subsequent broadcast, an editor may carefully select textual data for encoding into the audio/video signal. However, for a news broadcast or live television program broadcasted in real time, it is difficult for the editor to accurately insert the audio/video content based textual information in the audio/video signal. Therefore, it is desirable to provide a system that permits flexible editing of teletext information pertaining to a media stream to increase the accuracy and quality of the information provided.

SUMMARY AND OBJECTS OF THE INVENTION

The desirable results are advantageously achieved in a capture device that permits selecting portions of a media stream encoded with associated data based on specified event data. The associated data corresponds to the content within the media stream, and the event data includes words and phrases of media desired by a user. The capture device contains a media processing unit, a delay device, and a control device. The media processing unit includes a decoder that is configured to receive media streams and extract the associated data from the media stream. The delay device, configured as a circular buffer, stores a predetermined length of the media stream. The control device receives the event data, compares the associated data with the event data, and generates a trigger event when the associated data matches the event data.

In one embodiment, the media stream comprises an analog audio/video signal. In order to process the analog audio/video signal, the media processing unit includes an audio processing unit and a video processing unit. The audio processing unit digitizes and compresses the audio portion of the analog audio/video signal to generate digital audio, and the video processing unit digitizes and compresses the video portion of the analog audio/video signal to generate digital video. For this embodiment, the delay device comprises a random access memory (RAM) to store the digital audio and the digital video.

The capture device has application for use in an automated media stream capture system. The automated media stream capture system contains a media source that generates the media streams, and a master encoder that encodes the associated data into the media stream. The capture device receives the encoded media stream from the master encoder. In a first embodiment for the system, each client of the system contains a capture device to delay the media stream. In a second embodiment, the system includes a gateway, wherein the clients are coupled to the gateway and the capture device is contained with the gateway. In a third embodiment for the system, the media stream is delayed at the source (e.g. directly after encoding), and subsequently transmitted to the clients. The clients, gateways and capture device may be implemented with computer systems.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Figure 1:
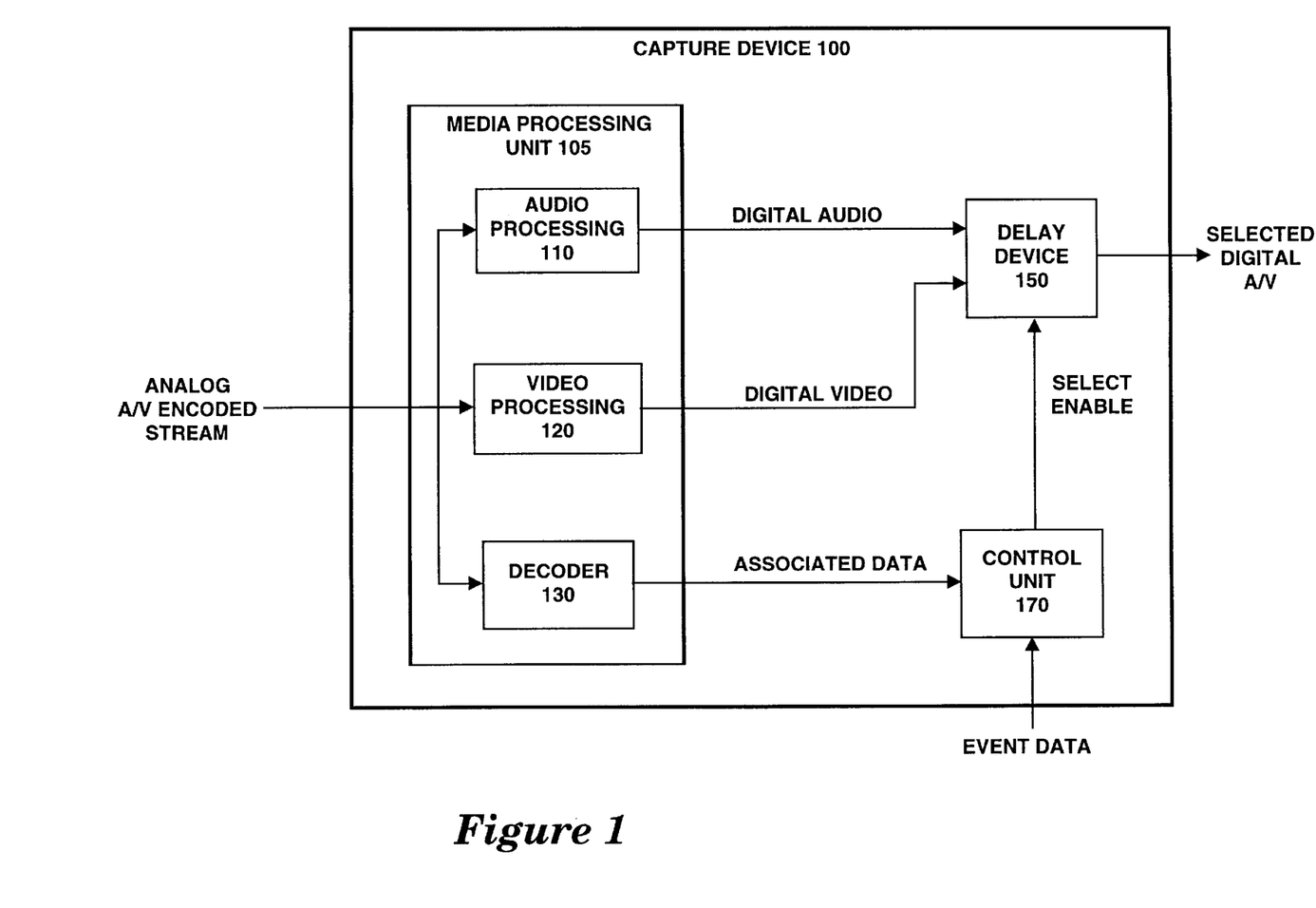
FIG. 1 is a block diagram conceptually illustrating a capture device configured in accordance with one embodiment of the present invention.

FIG. 1 is a block diagram conceptually illustrating a capture device configured in accordance with one embodiment of the present invention. In general, a capture device 100 receives a media stream, in real time, and captures a portion of the media stream. The capture device 100 operates in conjunction with one or more clients, either directly or indirectly. The clients generate event data to specify the content of the media sought by the capture device 100. Based on the event data, the capture device 100 provides selected media streams to the clients. The capture device 100 may be configured as a set top converter box for a client output display, or implemented in a computer system. A computer system incorporating the capture device 100 is described more fully below.

In one embodiment, a capture device 100 receives, as an input, an analog audio/video (A/V) encoded stream for the media stream. For purposes of explanation, the present invention is described in conjunction with a single media stream. However, in a preferred embodiment, the capture device 100 receives multiple media streams. The analog audio/video (A/V) encoded stream may comprise the National Television Standard Committee (NTSC) or phase alternation line rate (PAL) standard video signals. Although the present invention is described in conjunction with an analog audio/video encoded stream, any media content signal, such as analog audio only, analog video only, digital audio, digital video, etc., may be substituted for the media stream without deviating from the spirit and scope of the invention.

In addition to the analog audio/video (A/V) encoded stream, the capture device 100 receives event data from one or more clients. In response, the capture device 100 generates, as an output, a selected digital audio/video stream. The capture device 100 contains a media processing unit 105, a delay device 150, and a control unit 170. For a capture device operating with the analog audio/video encoded stream, the media processing unit 105 contains an audio processing unit 110, a video processing unit 120, a decoder 130. The audio processing unit 110 and the video processing unit 120 are coupled to the delay device 150, and the decoder 130 is coupled to the control unit 170.

The analog audio/video encoded stream is input to the audio processing unit 110, video processing unit 120, and the decoder 130 as shown in FIG. 1. In one embodiment, the audio processing unit 110 digitizes the analog audio/video stream for input to the delay device 150. In addition, the audio processing unit 110 compresses the audio portion of the audio/video stream more efficiently store and transfer the digital audio. The video processing unit 120 extracts the video data from the analog audio/video encoded stream, and digitizes the video portion to generate digital video. In addition, the video processing unit 120 compresses the digital video to more efficiently store and transfer video data.

The compression of digital data may be in accordance with MPEG standards. The video processing unit 120 may operate with both NTSC and PAL standard video signals. The compression of audio/video data permits transmission at higher data rates and utilizes less bandwidth in the transmission medium. In one embodiment, the video processing unit 120 contains an Intel® 82750PB pixel processor, manufactured by Intel® Corporation. The Intel 82750PB provides real time pixel manipulations, including compression of video data at 30 images per second. In addition, the 82750PB contains on-chip instruction random access memory (RAM) providing programmability for execution of a wide range of algorithms that support video compression/ decompression. For a complete description of the 82750PB, see I750, I860, and I960 Processors and Related Products, published by Intel® Corporation, 1993.

In general, the decoder 130 extracts the associated data encoded within the analog audio/video encoded stream. In one embodiment, the associated data are encoded in the vertical blanking field of the analog audio/video signal. However, the associated data may be encoded in the vertical and/or horizontal blanking intervals of the analog audio/ video signal. For an analog audio/video encoded stream formatted in the NTSC and PAL standards, the decoder 130 operates similar to a close caption decoder. The encoding and decoding of the associated data in the analog audio/ video encoded stream is described more fully below.

The delay device 150 is configured as a circular buffer, such that a predetermined length of the digital audio and the digital video is stored at a particular instance in time (e.g. the digital audio and the digital video are written to the beginning of the delay device when the delay device is full). Therefore, the digital audio and the digital video are continuously input to the delay device 150. In one embodiment, the delay device 150 comprises a random access memory (RAM) memory. In order to operate the delay device 150 as a circular buffer, the audio processing unit 110 and the video processing 120 include memory interfaces. The memory interfaces generate the appropriate addresses to write the digital audio and the digital video into the delay device 150. The digital audio and the digital video may be stored in any order.

In order to configure the capture device 100, the control device 170 receives the event data. The event data may comprise a single word or a grouping of words. The control unit 170 implements a search algorithm to compare the event data with the associated data. For example, the event data may include the phrase "stock market". For this example, the control unit 170 compares the words "stock market" with the associated data received from the decoder 130. The control unit 170 is coupled to the delay device 150, such that the control unit 170 generates a select enable for the delay device 150. If a match occurs between the event data and the associated data, the control unit 170 enables the delay device 150 to output the contents of the delay device (i.e. the selected digital A/V). For the embodiment employing a RAM for the delay device 150, the control unit 170 generates the appropriate read enable signals. When the control unit 170 generates an active select enable, the contents of the delay device 150 are output as selected digital audio/video (A/V). A number of applications for the capture device 100 are described below.

The capture device of the present invention provides a practical solution for capturing a media stream for selective output. For example, an analog audio/video encoded signal formatted in the NTSC standard, comprises a 6 MHz signal. For this example, the audio processing unit 110 generates digital audio at the rate of 11 kilobytes per second, and the video processing unit 120 generates digital video at the rate of 22 kilobytes per second. The decoder 130 generates the associated data at a rate of 1.2 kilobytes per second for input to the control unit 170. Furthermore, selected digital A/V is output from the delay device 150 at the rate of 300 kilobits per second or 38 kilobytes per second. For these data rate examples, a delay device 150 that stores 2 megabytes of digital audio/video information retains approximately 1 minute of digital audio/video. Therefore, depending upon the type of compression used, a delay device comprising 10 to 12 Megabytes may store up to 5 minutes of the media stream. Consequently, the capture device 100 provides a practical solution by permitting the storage of digital audio/ video for a relatively small amount of memory.

AUTOMATED MEDIA SELECT SYSTEMS

Figure 2:
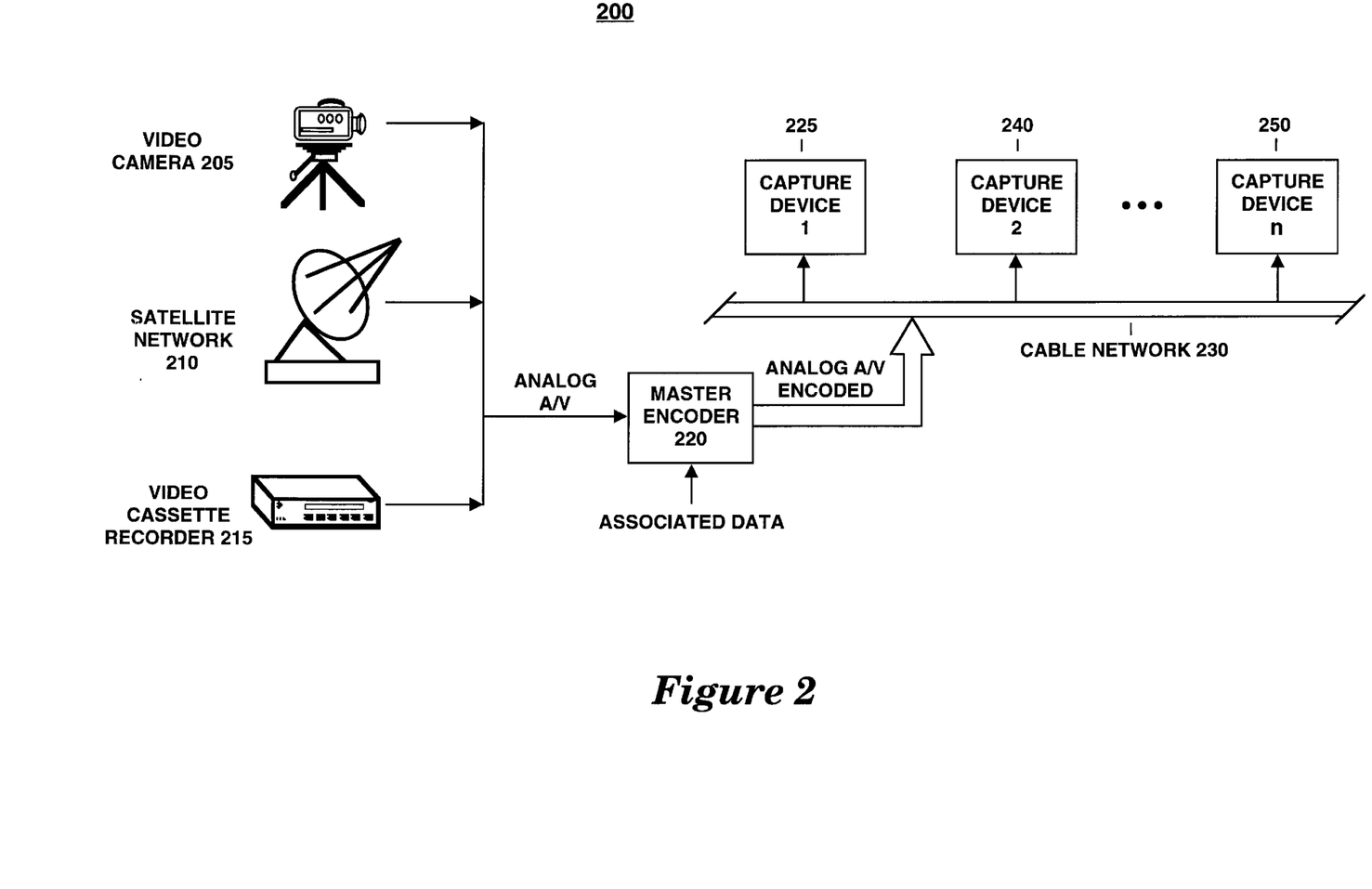
FIG. 2 illustrates a high level block diagram of an automated audio/video select system configured in accordance with one embodiment of the present invention.

FIG. 2 illustrates a high level block diagram of an automated audio/video select system 200 configured in accordance with one embodiment of the present invention. As shown in FIG. 2, analog audio/video is generated from a video source, such as a video camera 205, satellite network 210 or video cassette recorder 215. The analog audio/video signal is input to a master encoder 220. In addition to receiving the analog audio/video signal, the master encoder 220 receives the associated data corresponding to the analog audio/video signal. In general, the master encoder 220 combines the associated data and the analog audio/video to generate an analog audio/video encoded stream.

In one embodiment, the master encoder 220 utilizes a Norpak™ Corp., of Kanata, Ontario, Canada, model TDS3/TCI NABTS data delivery system as a video blanking encoder box. The analog audio/video encoded data are output to a cable network 230. The cable network 230 may comprise any communications network such as a satellite network or local cable network system. The audio/video select system 200 also contains "n" capture devices, such as capture devices 225, 240, and 250. The capture devices are configured as the capture device 100 illustrated in FIG. 1. Each capture device in the audio/video selected system is coupled to the cable network 230 to receive the analog audio/video encoded stream.

Each capture device (225, 240 and 250) may service a single client or operate as a gateway to service several clients. An audio/video select system utilizing a gateway to service a plurality of clients is described more fully below. The capture devices 225, 240, and 250, whether operating as a gateway or a client, decode the analog A/V encoded stream to extract the associated data, as well as compress and digitize the audio/video. The capture device outputs selected digital audio/video, based on the event data, to a client.

As discussed above, the digital audio/video may be delayed at the gateway or directly at the client. In order to delay at the client, the capture device 100 is directly implemented in a client computer system. For a system implementing delay at the client, the audio/video may be compressed/digitized at either the source or directly in the client. A system providing delay at the client results in the most flexible embodiment because the client need not view the media stream delayed. For some applications, a user of the client system may prefer to view the media stream in real time, and for other applications, the user may prefer to delay viewing the selected media stream.

Figure 3:
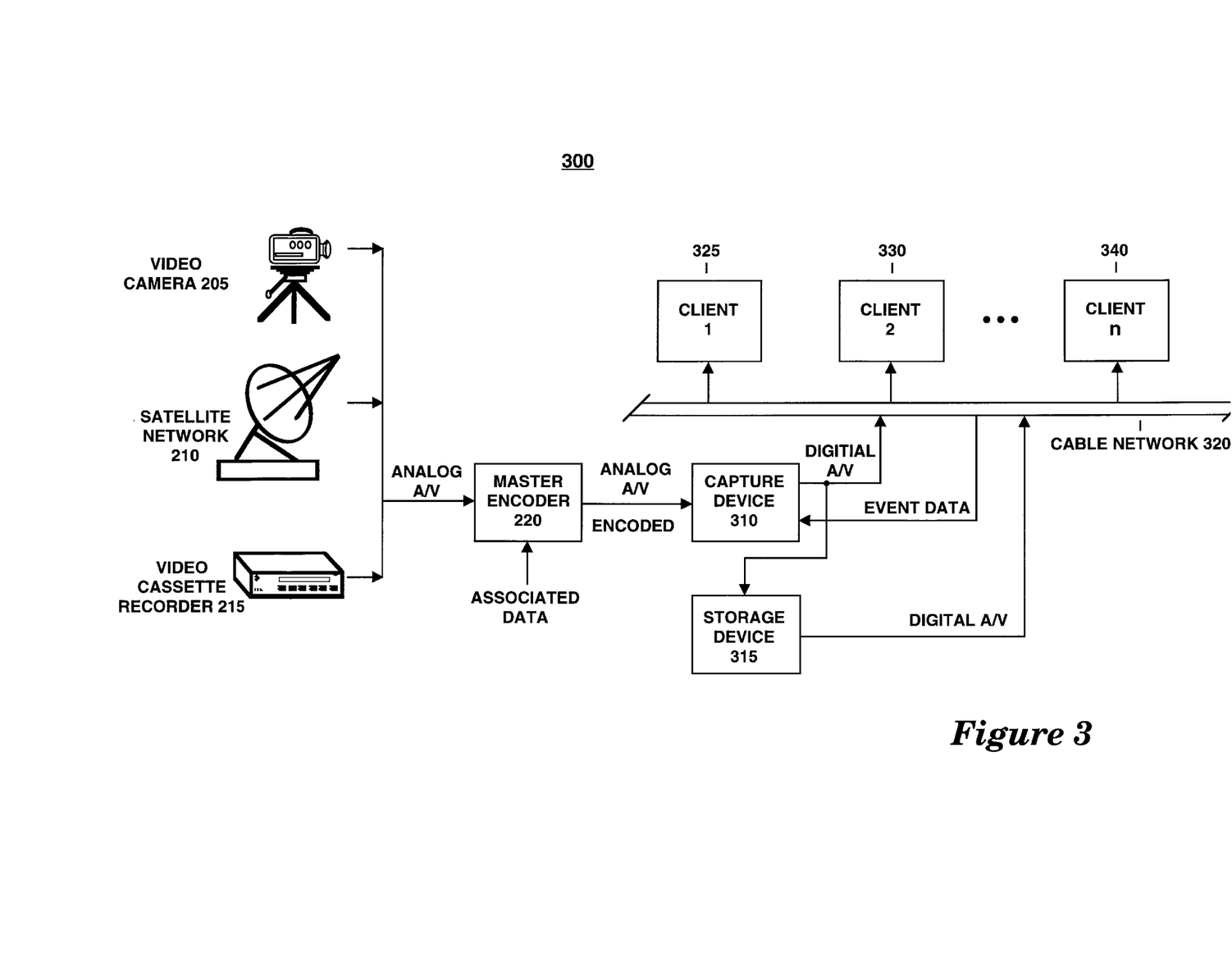
FIG. 3 illustrates a second embodiment for the audio/video select system of the present invention.

FIG. 3 illustrates a second embodiment for the audio/video select system of the present invention. A video source, such as a video camera 205, satellite network 210 or video cassette recorder 215, generates an analog audio/video signal. The analog audio/video signal and associated data are input to the master encoder 220 to generate the analog audio/video encoded stream. The analog audio/video encoded stream is directly input to a capture device 310. The capture device 310 is configured in accordance with the capture device 100 illustrated in FIG. 1. However, in order to service a number of clients, the capture device 310 is capable of processing and storing numerous audio/video streams. For the audio/video select system 300, only one central capture device is utilized. The single capture device 100 generates the digital audio/video for use by a plurality of clients.

The capture device 310 is coupled to a storage device 315 and a cable network 320. The digital audio/video may be saved by the storage device 315. In order to transmit the selected digital audio/video to the clients, the capture device 310 transmits digital audio/video on the cable network 320. For the select audio/video system 300, the cable network 320 may include any type of networking device configured to transport digital data. A plurality of clients, such as clients 325, 330, and 340 are coupled to the cable network 320. The clients 325, 330, and 340 provide event data to the capture device 310 over the cable network 320. When a match occurs between the event data and the associated data for an analog audio/video encoded stream, the capture device 310 transfers the digital audio/video to the appropriate client or to the storage device 315 for subsequent retrieval. Consequently, for the audio/video select system 300, delay is provided at the media source.

For an audio/video signal, the present invention utilizes the vertical blanking period of the audio/video signal to encode the associated data in the media stream. An audio/video signal formatted in the NTSC standard contains 525 lines and 60 fields per second. The standard NTSC signal contains 12 unused lines between the end of the post equalizing pulses and the beginning of the active picture signal in each field. However, some of these lines have already been allocated for certain use such as multiburst (line 17, field 1), color bars (lines 17, field 2), composite test (line 17, field ½), vertical interval reference (line 19, field ½), and close captioning (line 20, field ½).

The associated data encoded in the vertical blanking period of the NTSC signal comprises digital data. The digital data may include ASCII text, any alpha numeric coding, or graphical information. Because the digital data is encoded in the vertical blanking period, the audio/video content in the NTSC signal is not disturbed. The associated data may comprise a wide variety of information pertaining to the audio/video content, such as news headlines, programming details, captioning for the associated audio/video, classified advertisements, and weather.

The delay device of the present invention permits a loose synchronization between the media stream and the associated data. In one embodiment, the associated digital data is encoded in a vertical blanking period prior to the corresponding audio/video content in the NTSC signal. The encoding of the associated data prior to the audio/video content facilitates the search algorithm to further insure capturing of the selected audio/video portion. In a second embodiment for encoding associated data on the media stream, the associated digital data is encoded in a vertical blanking period subsequent to the corresponding audio/video content in the NTSC signal. For example, the encoding format may consist of four frames of data followed by the associated text encoded in the following vertical blanking periods for the next two fields. The length of the associated data for any particular system is dependent upon the amount of information desired.

The delay device of the present invention permits a wide range of applications for encoding associated data with a media stream. The delay device relaxes the requirement of synchronizing the media stream with the associated data. The captioning of associated data in the media stream in real time is difficult to accomplish. For example, an editor may provide associated data for a television program subsequent to taping of the television program. In this example, the editor has ample opportunity to place accurate information in the associated data fields. However, an editor providing a caption for a real time headline news broadcast, does not typically have the ability to fine tune the captioning information. Although the delay device of the present invention provides a delay in the broadcasting of such a headline news program, a premium is placed on the accuracy of the associated data. With such a delay, an editor has the ability to provide accurate captioning information for the associated data.

COMPUTER SYSTEM IMPLEMENTATIONS

Figure 4:
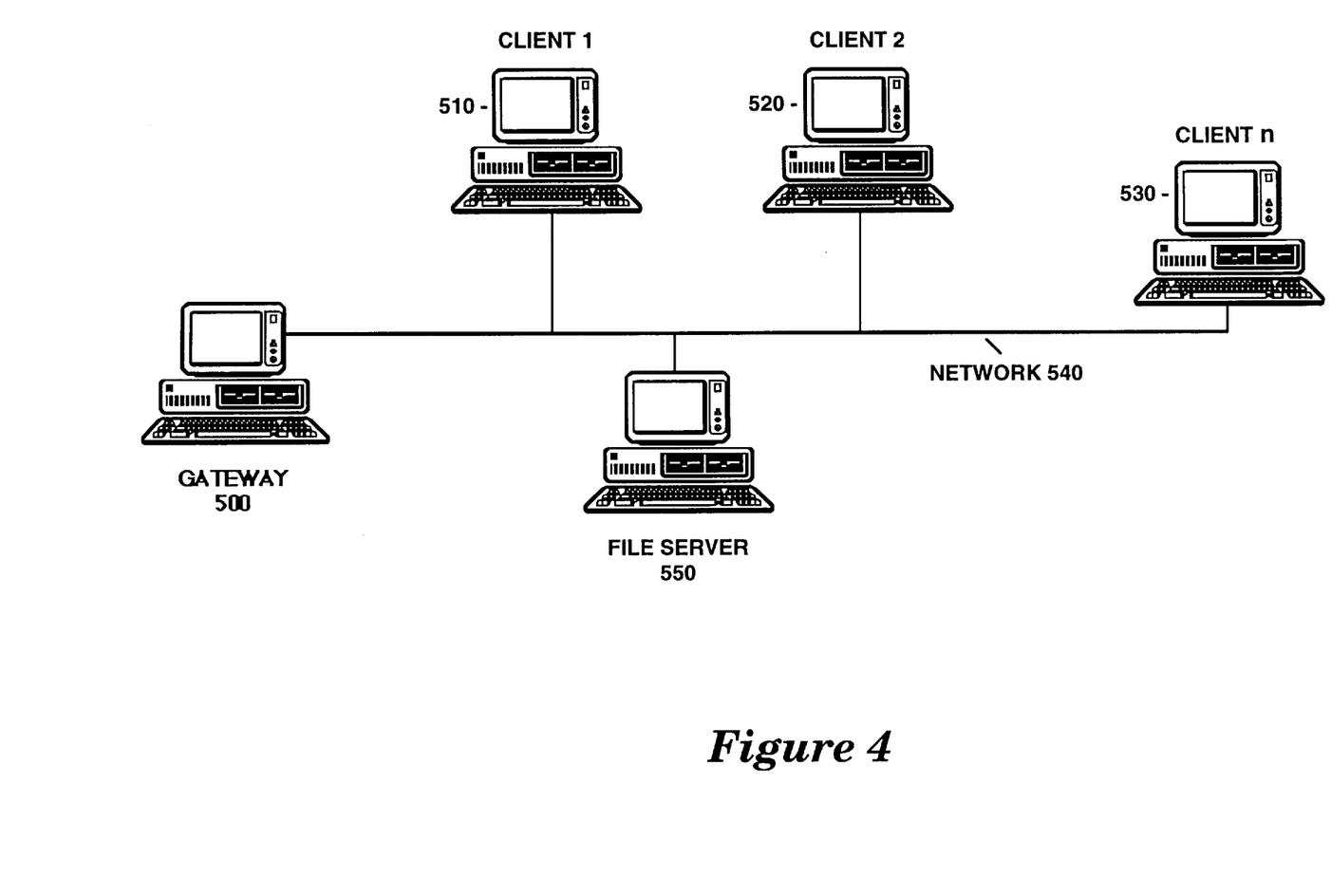
FIG. 4 illustrates a gateway configured in accordance with one embodiment for the audio/video select system of the present invention.

FIG. 4 illustrates a gateway configured in accordance with one embodiment for the audio/video select system of the present invention. A computer system 500 is configured as a gateway. The gateway computer system 500 is coupled to a plurality of client computer systems, 510, 520 and 530, via a network 540. In operation, the client computer systems contain configuration programs that permit the user to specify the event data. The event data is transferred from the client computer systems 510, 520, and 530 to the gateway computer system 500. The gateway computer system 500 stores the event data for each client so as to uniquely identify the particular event data for the corresponding client. The gateway computer system 500 receives the analog A/V encoded stream, and decodes the stream to generate the associated data. In addition, the gateway computer system 500 digitizes and compresses the audio/video for storage in the delay device. The gateway computer system 500 compares the associated data with the event data for each client. If a match occurs, the gateway computer system 500 triggers an event for the corresponding client.

Figure 5:
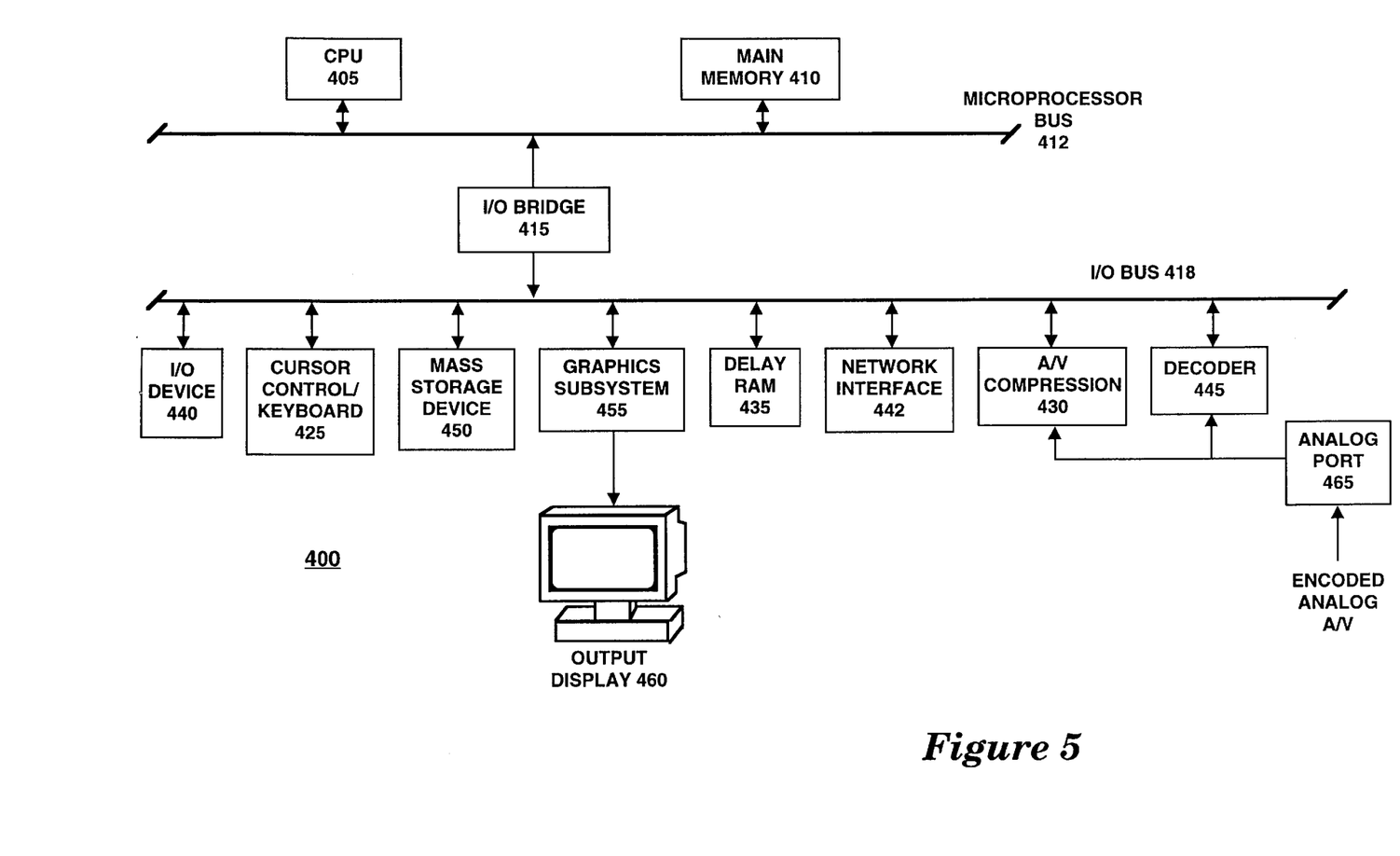
FIG. 5 illustrates one embodiment for a computer system configured to implement the capture device of the present invention.

FIG. 5 illustrates one embodiment for a computer system configured to implement the capture device of the present invention. A computer system 400 contains a central processing unit (CPU) 405 and main memory 410 coupled to a microprocessor bus 412. In addition, the computer system 400 contains a number of peripheral devices, such as an I/O device 440, cursor control/keyboard interface 425, mass storage device 450, and a graphics subsystem 455. For the computer implementation shown in FIG. 5, the peripheral devices are coupled to an I/O bus 418, and communicate with the microprocessor bus 412 via an I/O bridge 415. The computer system further includes an output display 460 to display graphics for the computer system through the graphics subsystem 455. The CPU 405, main memory 410, I/O bridge 415, I/O device 440, cursor control/keyboard interface 425, mass storage device 450, graphics subsystem 455 and output display 460 are those devices typically found in a computer system, and in fact, are intended to represent a broad category of computer components which are well known in art.

In order to implement the capture device 100 on computer system 400, the computer system 400 further includes audio/video (A/V) compression unit 430, delay random access memory (RAM) 435, network interface 442, analog port 465, and decoder 445. The analog port 465 is configured to receive the analog audio/video encoded stream. The computer system 400 may be configured as a gateway or as a client. In operation, the computer system 400 receives the analog audio/video encoded stream at the analog port 465. The analog port 465 transfers the analog audio/video encoded stream to the A/V compression unit 430 and decoder 445. The decoder 445 extracts the associated data from the analog audio/video encoded stream. In one embodiment, the associated data is transferred from the decoder 445 to the main memory 410. The A/V compression unit 430 digitizes and compresses the audio/video encoded stream in one of several embodiments as discussed above. The A/V compression unit 430 transfers the digitized A/V to the delay RAM 435.

If the computer system is configured as a gateway, then clients communicate the event data to the computer system 400 via a network (not shown). The computer system 400 receives the event data at the network interface 440, and stores the event data in the main memory 410. If the computer system 400 is configured as a client, then event data is entered through a configuration program and stored in the main memory 410. The CPU 405 executes a search algorithm to determine whether a match occurs between the event data and the associated data. If a match occurs and the computer system 400 is configured as a gateway, then the computer system 400 transfers the contents of delay RAM 435 to the appropriate client via the network interface 440. If the computer system 400 is configured as a client, and a match occurs, then the event is triggered in the computer system 400. In addition to delivering the digital A/V to the client, the computer system 400 may store the digital A/V in the mass storage device 450 or a file server coupled to the network.

For the audio/video select system of the present invention, the triggering of an event may occur in a variety of forms. In one embodiment, in order to trigger an event, an alert is sent to the client computer system to enable client software to "pop-up" on the computer screen and display the selected media stream. Because the delay device stores several seconds of the media stream, the client receives the media stream starting at a point prior to the detection of the event data in the media stream. Therefore, the user of the client computer system has sufficient time to pay attention to the pop-up display before the actual event data causing the match appears on the computer system screen.

In a second embodiment for event triggering, the event triggering consists of transferring the contents of the delay device to the file server 550 for storage and subsequent retrieval of the selected media stream. For the second embodiment, the media stream may be transferred to the client computer systems in real time (e.g. simultaneous to transfer to the delay device). In this configuration, the client may view a selected audio/video channel, and upon a match occurring, be advised of the event. In a third embodiment for event triggering, the gateway computer system 500 informs the corresponding client to switch the channel to the channel containing the event data.

In the embodiments where the triggering of an event generates an alert, a variety of scenarios are possible. For example, a client computer system may display only video during normal operation. When an alert is asserted, the audio portion of the A/V stream is activated. Inversely, the client computer system may be configured to play the audio portion of the media stream, and upon assertion of the alert, display the video portion of the associated media stream match. In another scenario, the gateway computer system 500 transmits an alert to a client computer system, wherein the user does not desire to immediately view the select media stream. The alert may consist of any audio/visual alarm. For example, a computer system audio sound may be invoked upon receiving of the alert signal. In response, the user of the client computer system may either immediately begin viewing the digital media stream, or retrieve the stored digital A/V from the file server 550 at a later time.

Although the present invention has been described in terms of specific exemplary embodiments, it will be appreciated that various modifications and alterations might be made by those skilled in the art without departing from the spirit and scope of the invention as set forth in the following claims.

What is claimed is:

1. An apparatus for selecting portions of a stream of media signals, the stream of media signals having content data encoded with associated data, the apparatus comprising:

a media processing unit for receiving the stream of media signals and decoding the media signals to recover the encoded associated data as the stream of media signals is received;

a delay device for receiving and reuseably storing up to a predetermined length of the stream of media signals received at any one point in time, and outputting the stored predetermined length of the stream of media signals whenever an output enable is received; and a control device, responsive to the media processing unit and an external source, for receiving event data and the associated data, and generating the output enable whenever a predetermined relationship between the associated data and the event data is detected.

2. The apparatus of claim 1, wherein the stream of media signals is comprised of a plurality of audio signals, video signals and information signals.

3. The apparatus of claim 1, wherein the media processing unit further comprises:

a decoder configured to receive the stream of media signals having encoded associated data and extract, decode and output associated data from the stream of media signals as the stream of media signals is received;

an audio processing unit for digitizing and compressing any analog audio signals included in the plurality of audio signals; and a video processing unit for digitizing and compressing any analog video signals included in the plurality of video signals.

4. The apparatus of claim 1, wherein the associated data corresponds to certain content of the media signals.

5. The apparatus of claim 1, wherein the control device further generates a trigger event for the external source whenever a predetermined relationship between the associated data and the event data is detected.

6. The apparatus of claim 1, wherein the delay device is comprised of a plurality of reuseable storage locations configured to store up to the predetermined length of the stream of media signals as the stream of media signals is received, and once the reuseable storage locations are all in use, the delay device begins to overwrite to the reuseable storage locations in use.

7. The apparatus of claim 6, wherein the delay device is comprised of a circular buffer.

8. An automated media capturing system, the system comprising:

a plurality of media sources generating a corresponding plurality of media signals;

a master encoder for encoding each of the plurality of media signals with associated data corresponding to content data of the media signals, and consolidating the plurality of media signals into a stream of media signals having content data encoded with associated data; and a plurality of capture devices for receiving, selecting and outputting different portions of the stream of media signals, in accordance with event data provided to the particular capture devices, including decoding the stream of media signals to recover the encoded associated data, and detecting for pre-determined relationship between the associated data and the event data.

9. The system of claim 8, wherein each capture device comprises:

a media processing unit for receiving the stream of media signals and decoding the encoded associated data as the stream of media signals is received;

a delay device for receiving and reuseably storing up to a predetermined length of the stream of media signals received at any point in time, and outputting the stored predetermined length of the stream of media signals whenever an output enable is received; and a control device, responsive to the media processing unit and an external source, for receiving the associated data and event data, and generating the output enable whenever a predetermined relationship between the associated data and the event data is detected.

10. The apparatus of claim 9, wherein the delay device is comprised of a plurality of reuseable storage locations configured to store up to the predetermined length of the stream of media signals as the stream of media signals is received, and once the reuseable storage locations are all in use, the delay device begins to overwrite to the reuseable storage locations in use.

11. The apparatus of claim 10, wherein the delay device is comprised of a circular buffer.

12. The system of claim 9, wherein the control device further generates a trigger event whenever a predetermined relationship between the associated data and the event data is detected.

13. The system of claim 8, wherein the master encoder receives the plurality of media signals and encodes an associated data corresponding to certain content data of the media signals.

14. The system of claim 8, further comprising a plurality of client computer systems correspondingly hosting the plurality of capture devices, for generating the event data for the correspondingly hosted capture devices, and receiving the correspondingly selected portions of the stream of media signals, and an interactive network operatively coupling the master encoder and the plurality of client computer systems.

15. A system for selecting a portion of a stream of media signals, the stream of media signals having content data encoded with associated data, the system comprising:

a plurality of media sources generating a corresponding plurality of media signals having content data;

a master encoder for receiving the plurality of media signals having content data and encoding each of the plurality of media signals with corresponding associated data, and consolidating the plurality of media signals having content data encoded with associated data into a stream of media signals having content data encoded with associated data; and a capture device for receiving, decoding and extracting associated data from the stream of media signals having content data encoded with associated data as the stream of media signals is received, and selecting portions of the received stream of media signals corresponding to a predetermined relationship between the associated data and event data provided to the capture device, whenever the predetermined relationship is detected.

16. The system of claim 15, wherein the capture device comprises:

a media processing unit for receiving the stream of media signals and decoding the encoded associated data as the stream of media signals is received;

a delay device for receiving and reuseably storing up to a predetermined length of the stream of media signals received at any point in time, and outputting the stored predetermined length of the stream of media signals if an output enable is received; and a control device for receiving the event data and the associated data, and generating the output enable whenever a predetermined relationship between the associated data and the event data is detected.

17. The system of claim 16, wherein the control device further generates a trigger event for the external source whenever a predetermined relationship between the associated data and the event data is detected.

18. The system of claim 15, further comprising a plurality of system clients, interconnected to the capture device and to each other by an interactive network.

19. The system of claim 18, wherein the interactive network is comprised of a commercially available cable television network.

20. A method of selecting portions of a stream of media signals, the stream of media signals having content data encoded with associated data, the method comprising the steps of:

receiving the stream of media signals having content data encoded with associated data;

processing the stream of media signals to decode and extract associated data from the stream of media signals having content data encoded with associated data as the stream of media signals is received;

reuseably storing up to a predetermined length of the stream of media signals in a delay device;

comparing the extracted associated data with event data; and generating an output enable for the delay device when a predetermined relationship between the extracted associated data and the event data is detected.

21. The method of claim 20, further comprising:

generating the event data by a system client; and transferring the selected portion of the stream of media signals to the system client when the output enable is generated.

22. The method of claim 21, further comprising generating a trigger event for the system client whenever a predetermined relationship between the associated data and the event data is detected.

23. A system for selecting a portion of a stream of media signals, the stream of media signals having content data encoded with associated data, the system comprising:

a media source for generating the stream of media signals having content data encoded with associated data;

a capture device, responsive to the media source and an external source, for receiving the stream of media signals, and decoding the stream of media signals to extract the encoded associated data as the stream of media signals is received, and outputting a select portion of the stream of media signals when a relationship between the extracted associated data and event data is detected; and an interactive network having a plurality of remotely located clients, each coupled to the capture device, for generating the event data, and for receiving independent selected portions of the stream of media signals corresponding to the event data.

* * * * *